Oct. 23, 1962    C. D. TODD    3,060,348
HIGH SPEED CIRCUIT BREAKERS
Filed Feb. 24, 1961    3 Sheets-Sheet 1

INVENTOR.
CARL D. TODD,
BY
Walter J. Adam
ATTORNEY.

INVENTOR.
CARL D. TODD,
BY Walter J. Adam
ATTORNEY.

3,060,348
HIGH SPEED CIRCUIT BREAKERS
Carl D. Todd, Costa Mesa, Calif., assignor to Hughes Aircraft Company, Culver City, Calif., a corporation of Delaware
Filed Feb. 24, 1961, Ser. No. 91,510
12 Claims. (Cl. 317—33)

This invention relates to overload protection circuits and particularly to a simplified and high speed circuit breaker utilizing semiconductor elements.

For adequate overload protection of a circuit or other loads high speed circuit breaker action is often required to provide a satisfactory degree of protection. Conventional fuses and circuit breakers require a relatively long time before responding to an overload condition, and the accuracy of the limit current at which the circuit breaker responds leaves much to be desired. A circuit breaker that responds in the 1 microsecond range and faster would be very desirable. Because conventional circuit breakers do not respond to a sharply defined limit current, the protection afforded is only for severe overload conditions where protection at a precise limit current of often desirable. Also, conventional circuit breaker arrangements are limited to use at relatively high current values.

It is therefore an object of this invention to provide a simplified and accurate overload protection circuit.

It is a further object of this invention to provide a circuit breaker that responds very rapidly to a sharply defined overload limit current.

It is a still further object of this invention to provide a high speed, temperature stable circuit breaker that provides reliable overload protection for relatively small current operation and that operates with an unregulated voltage source.

It is another object of this invention to provide an improved overload protection circuit that may be tripped or reset by a trigger signal.

Briefly the circuit breaker in accordance with this invention includes a tunnel diode and a transistor coupled in series with the load and with the transistor controlled by a fixed bias voltage and the voltage developed across the tunnel diode. For load currents below the limit value, the tunnel diode remains in the low voltage state during normal operation with the transistor biased in conduction by the fixed supply. When the load current is increased above the limit value, the peak current of the tunnel diode is exceeded and the tunnel diode triggers to the high voltage state to switch the transistor out of conduction. A locking current path is provided to maintain the tunnel diode in the high voltage state until a reset potential is applied thereto so as to return the circuit to normal operation.

The novel feature of this invention, as well as the invention itself, both as to its organization and method of operation, will best be understood from the accompanying description taken in connection with the accompanying drawings in which.

Figure 5:
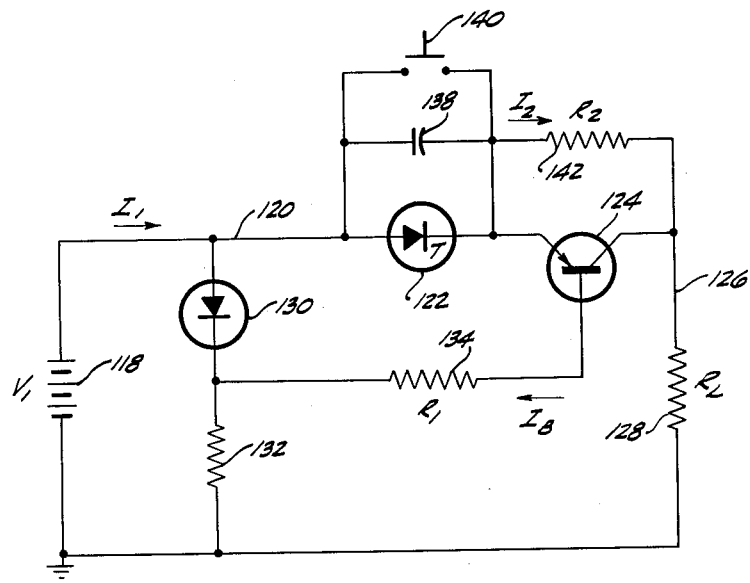
Figure 6:
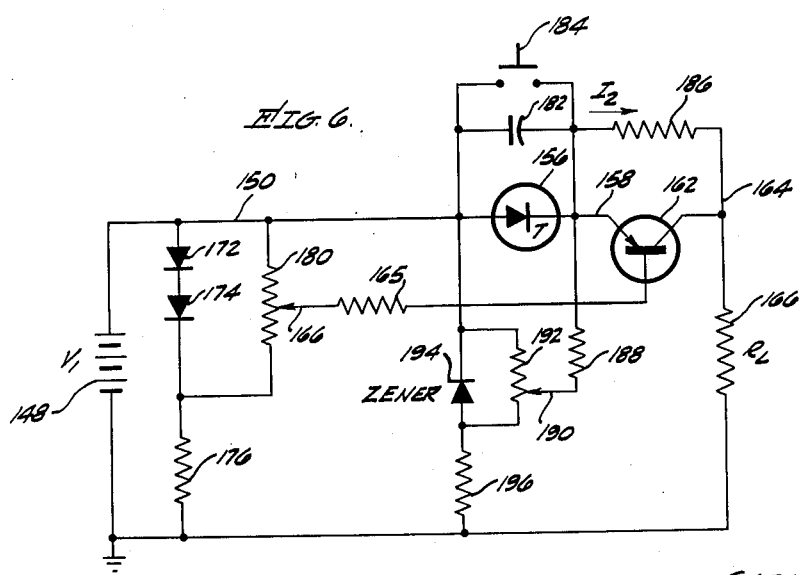

FIG. 5 is a schematic circuit diagram of a third arrangement of the circuit breaker in accordance with this invention having improved operation when utilized in conjunction with an unregulated voltage supply; and FIG. 6 is a schematic circuit diagram of a fourth arrangement in accordance with this invention providing an adjustable limit current and operable in conjunction with an unregulated voltage supply.

Figure 1:
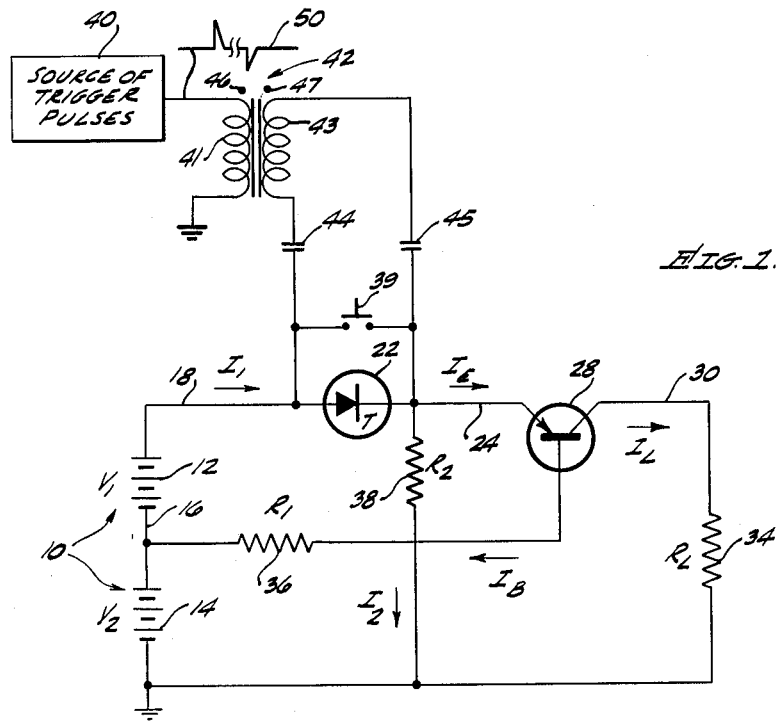
FIG. 1 is a schematic circuit diagram of a high speed circuit breaker in accordance with this invention.

Referring first to FIG. 1 a source of supply voltage 10 includes a battery 12 of a voltage $V_1$ having a negative terminal coupled to a lead 16 and a positive terminal coupled to a lead 18, and includes a battery 14 of voltage $V_2$ having a positive terminal coupled to the lead 16 and a negative terminal coupled to ground. The lead 18 applies current $I_1$ through the anode to cathode path of a tunnel diode 22 to a lead 24, through the emitter to collector path of a transistor 28 to a lead 30, and through a load 34 which may have a value $R_L$ to ground. The transistor 28 which may be of the p-n-p type has a base coupled through a resistor 36, having a value $R_1$, to the lead 16 so that the potential $V_1$ minus the potential developed across the tunnel diode 22 minus the potential developed across the resistor 36 controls the conductivity of the transistor 28. To provide a locking current $I_2$ for the tunnel diode after occurrence of an overload condition, a resistor 38 having a value $R_2$ is coupled between the lead 24 and ground. For resetting the circuit breaker to the normal operation state, a normally open reset switch 39 has two terminals coupled across the diode 22 between the leads 18 and 24. A source 40 of reset or trigger pulses may be coupled to a first winding 41 of a transformer 42 and through a second winding 43 which in turn is coupled through a coupling capacitor 44 to the lead 18 and through a coupling capacitor 45 to the lead 24. The transformer 42 has a polarity relation represented by dots 46 and 47. As will be discussed subsequently, positive pulses of the waveform 50 resets the relay circuit to a normal conductive state and negative pulses of the waveform 50 sets the relay circuit to a non-conductive state when remote control is desired.

Figure 2:
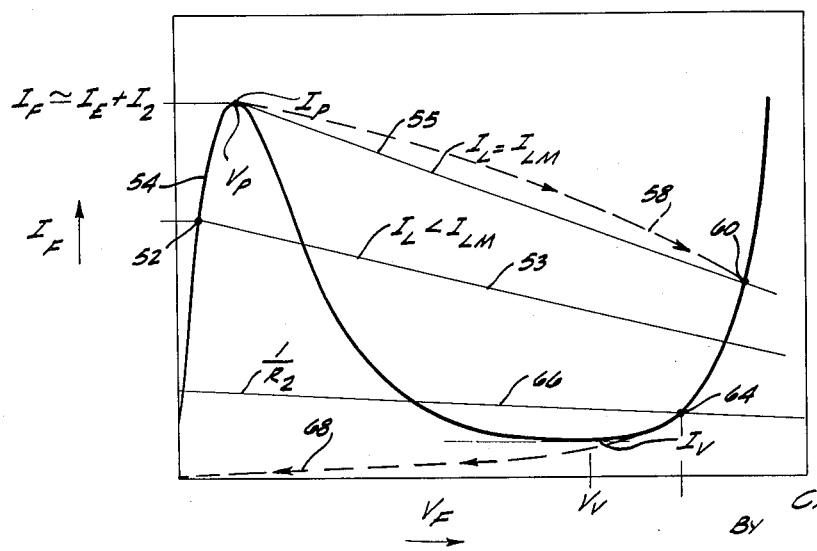
FIG. 2 is a graph of forward voltage versus forward current for explaining the operation of the tunnel diode in the circuit of FIG. 1.

In operation the tunnel diode 22 is normally maintained at the low voltage state such as a point 52 on a curve 54 of FIG. 2 below the peak current $I_P$ with a load condition indicated by a load line 53. When the tunnel diode 22 is maintained at a point such as 52 the transistor 28 is maintained in conduction and the circuit breaker is in the normal reset condition. The voltage $V_1$ minus the low voltage drop across the tunnel diode 22 provides sufficient potential on the emitter of the transistor 22 to maintain the transistor forward biased and conducting load current $I_L$ in a saturated condition. It is to be noted that the forward current $I_F$ which is the current $I_1$ in FIG. 1 passing through the tunnel diode 22 at the point 52 is the load current $I_L$ plus the locking current $I_2$ which is the relatively small current flowing through the resistor 38. $I_F$ also includes a small current $I_B$ which may normally be neglected for practical cases. When the current $I_F$ increases to $I_P$ and attempts to exceed this current which is the limit current for the circuit breaker tunnel diode 22, the tunnel diode 22 changes state with a trigger type action indicated by a dotted line 58 to a point 60 on the curve 54. At the limit current, a load line 55 is present with the load current $I_L$ equal to the maximum load current $I_{LM}$. With the relatively large voltage drop across the tunnel diode 22 in the high voltage state at the point 60 subtracted from the voltage $V_1$, the transistor 28 is either reverse biased between the emitter and base thereof or forward biased a very small amount so that the transistor 28 is rapidly switched out of conduction. Thus, the current $I_1$ flowing through the tunnel diode 22 decreases rapidly, and the operating point of the tunnel diode 22 falls rapidly from the point 60 to a point 64 at a load line 66 resulting from the current $I_2$ flowing through the resistor 38. Thus, the relatively small current flowing through the resistor 38 prevents the tunnel diode 22 from switching back to the low voltage state so that the circuit breaker maintains the load 34 disconnected from the source 10, which is the set condition for the circuit breaker.

When it is desired to reset the circuit breaker for again supplying load current to the load 34, the reset switch 39 may be closed to decrease the current $I_F$ through the tunnel diode to zero so that the tunnel diode 22 rapidly changes state from the point 64 along the path indicated by the dotted line 68. When the reset switch 39 is released, the operating point of tunnel diode 22 progresses along the curve 54 to the operating point 52. If it is desired to reset the circuit breaker by remote control for again supplying load current to the load 34, a positive pulse of the waveform 50 is applied to the transformer 42, which in turn applies a positive potential to the lead 24 and a negative potential to the lead 18 to reverse bias the tunnel diode 22 and substantially decrease the current $I_F$ through the tunnel diode 22. Thus, the tunnel diode 22 falls below the point 64 to the valley current $I_V$ and rapidly triggers to the low voltage state as indicated by the dotted line 68. As the positive trigger pulse of the waveform 50 falls, the tunnel diode 22 is again forward biased and the low voltage drop developed thereby allows the transistor 28 to be forward biased by supply voltage $V_1$ and the current $I_1$ or $I_F$ to increase to the operating point 52. The circuit thus continues to supply load current until another overload condition occurs.

If it is desired to trigger the circuit breaker to the set or triggered condition when the circuit is supplying load current and the tunnel diode 22 is at the operating point 52, a negative pulse of the waveform 50 can be applied to the transformer 42 to increase the forward bias of the tunnel diode 22. This temporary condition causes the current $I_F$ to exceed the limit current $I_P$ and the circuit changes to the set condition with the transistor 28 biased out of conduction as discussed above.

To further explain the circuit of FIG. 1, the circuit breaker fires when the current $I_1$ attempts to exceed the peak current $I_P$.

$$I_1 = I_2 + I_E$$

$$I_1 = \frac{V_1 + V_2}{R_2} + I_B + I_L$$

The emitter current $I_E$ and the base current $I_B$ are indicated in FIG. 1. The maximum load current or limit current $I_{LM}$ when $I_1$ attempts to exceed $I_P$ may be expressed as:

$$I_{LM} = I_P - I_B - \frac{V_1 + V_2}{R_2}$$

Thus, in the circuit of FIG. 1 the limit current is a function of $R_2$ and the voltages $V_1$ and $V_2$ of the source 10. For a substantially constant $I_{LM}$, the voltages $V_1$ and $V_2$ must be substantially constant or regulated. The base current $I_B$ has a relatively small value and a small effect on $I_{LM}$. It is desirable that the base current $I_B$ be chosen to saturate the transistor 28 at load currents up to the maximum and may be expressed as:

$$I_B = \frac{I_{LM}}{h_{FE}}(1+k)$$

where $h_{FE}$ is the non-saturated value of the current gain, and the constant $k$ determines the degree of saturation of the transistor 28, a practical value being 0.5.

The base current $I_B$ may also be expressed as:

$$I_B = \frac{V_1 - V_F - V_{EB}}{R_1}$$

where $V_F$ is the forward voltage of the tunnel diode 22 and $V_{EB}$ is the voltage between the emitter and base of the transistor 28.

Thus, to bias the transistor 28 out of conduction when the circuit is in the set condition, zero base current will flow if $V_F$ is equal to $V_1$. When $V_{EB}$ for the transistor 28 is less than a value $V_K$ shown at the knee of a curve 70 of FIG. 3, base current $I_B$ will be negligible, and hence transistor 28 will be turned off. The value of $V_K$ may be approximately 0.6 volt for silicon transistors and 0.2 volt for germanium transistors. Thus, it is not necessary that the voltage swing of the tunnel diode 22 be sufficient to reverse bias the transistor 28. When the sum of the forward voltage of the tunnel diode 22 and the voltage $V_K$ is greater than $V_1$, the transistor 28 is biased out of conduction.

The series voltage drop $V_S$ across the circuit breaker in the reset condition for values of load current below the maximum limit may be approximated as:

$$V_S = V_F - V_{CE(SAT)}$$

where $V_F$ is less than $V_P$ and $V_{CE(SAT)}$ is measured at the current $I_F$. Thus, the voltage drop of the circuit breaker in accordance with this invention is relatively small.

The limiting current $I_{LM}$ is slightly dependent on the supply voltage $V_1$ as discussed above. If the transistor 28 has a relatively high $h_{FE}$ so that the base current can be neglected or if $V_1$ is derived from a constant voltage source, a factor $\theta$, which is a ratio of the percentage of change of $I_{LM}$ to the percentage of change in $V_1$, may be expressed as:

$$\theta = \frac{1}{\frac{I_P}{I_2} - 1}$$

It can be seen that the best stability in the limit current $I_{LM}$ is obtained when the value of $I_2$ approaches $I_V$ of the tunnel diode 22 so that a lower value of $\theta$ is obtained. However, the limit current has been found to be relatively constant when the variations of $V_1$ are relatively small such as when the voltage source 10 is regulated and the $h_{FE}$ of the transistor 28 is relatively large.

In selecting the tunnel diode 22 the value of $I_P$ must be greater than the maximum load current $I_{LM}$ by an amount equal to the sum of $I_B + I_2$. The minimum value for $I_2$ is equal to the value $I_V$ of the tunnel diode 22. As the value of $I_B$ may be only a small portion of the maximum load current, another requirement of the tunnel diode 22 may be that the difference between the values of $I_P$ and $I_V$ be greater than $I_{LM}$. It is sometimes preferable to select a tunnel diode so that the difference between $I_P$ and $I_V$ is at least 20 percent greater than $I_{LM}$ so that accurate adjustment may be made by varying resistor 38.

The tunnel diode 22 may be of any conventional type but gallium arsenide tunnel diodes which exhibit a higher valley voltage than germanium units allow a substantial reverse $V_{BE}$ to be applied to the transistor to improve the breakdown voltage, leakage current and the switching speed thereof. It is to be noted that within the principles of the invention, two or more tunnel diodes may be provided in series to provide a higher switching voltage to the transistor 28.

For reliable operation the transistor 28 must have a sufficiently high $h_{FE}$ at the maximum load current and must have a voltage rating in excess of $V_1+V_2$. For high speed operation, a transistor must be selected having a fast response time. It has been found that the speed of the transistor 28 generally provides the limit to the speed of operation. However, it is believed that with the circuit of FIG. 1 the load 34 may be disconnected from the source 10 in as short a period as 10–20 millimicroseconds. The transistor 28 may be any conventional type but for high temperature operation a silicon transistor may be desirable.

Figure 3:
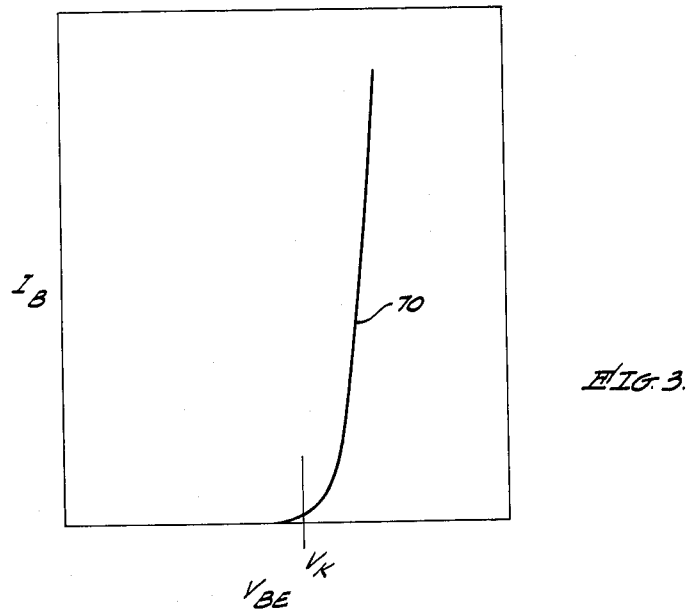
FIG. 3 is a graph of base to emitter voltage versus base current for explaining the operation of the transistor in the circuit of FIG. 1.

The supply voltage $V_1$ should be of sufficient value to provide the required $I_B$ when the tunnel diode 22 is in the set or low voltage condition, but should be less than the sum of $V_V$ of the tunnel diode 22 and the value of $V_K$ as shown in FIG. 3. The voltage $V_1$ may be obtained from a voltage supply other than the battery 12 by a voltage divider arrangement, for example.

Figure 4:
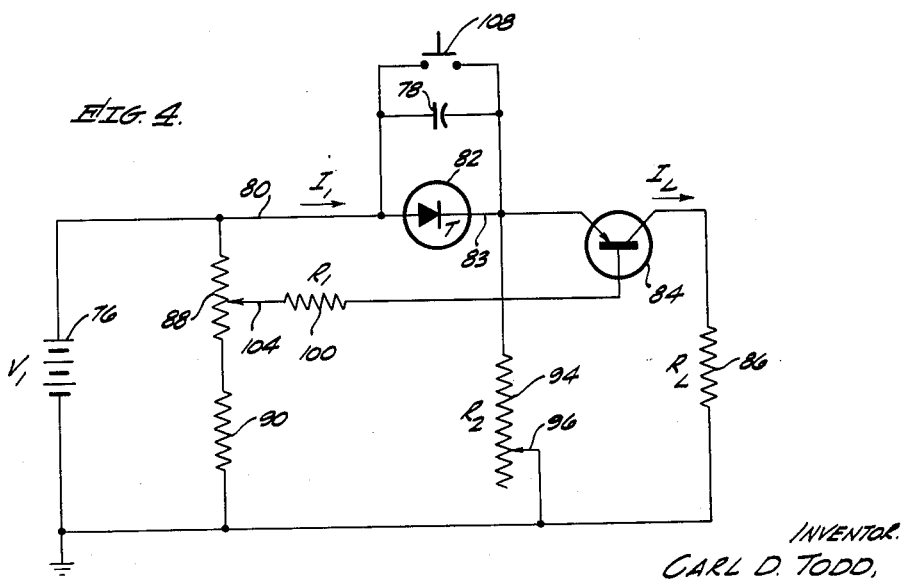
FIG. 4 is a schematic circuit digram of a second arrangement of the circuit breaker in accordance with this invention.

Another arrangement of the circuit breaker in accordance with this invention is shown in FIG. 4 responding to a single voltage source such as a battery 76 and which includes a capacitor 78 to prevent the circuit from responding to short term voltage or current transients. The negative terminal of the battery 76 is coupled to ground and the positive terminal supplies current through a lead 80, the anode to cathode path of a tunnel diode 82 to a lead 83, through the emitter to collector path of a transistor 84, and through a load 86 to ground. The transistor 84 may be of the p-n-p type. A voltage divider arrangement includes resistors 88 and 90 coupled in series across the battery 76. A resistor 94 is coupled at one end to the lead 83 with a movable tap 96 coupled therefrom to ground so as to provide adjustment of the $R_2$ value. A base resistor 100 having the value $R_1$ is coupled between the base of the transistor 84 and a movable tap 104 contacting the resistor 88. The capacitor 78, which provides sufficient delay to prevent the circuit from triggering in response to short term transients, is coupled across the tunnel diode 82. A reset switch 108 is also coupled across the tunnel diode 82. It is to be noted that for remote control, the switching arrangement of FIG. 1 may also be utilized in the circuit of FIG. 4.

The operation of the circuit breaker of FIG. 4 is similar to that of FIG. 1 with the tunnel diode 82 responding to the peak current $I_P$ to trigger to the set state and bias the transistor 84 out of conduction. Also, the tunnel diode 82 responds to the reset switch 108 to temporarily decrease the current flowing through the tunnel diode 82 so the condition thereof changes to the low voltage state. Similar to the circuit of FIG. 1, the limit current $I_{LM}$ is substantially constant when a regulated voltage source is provided such as the battery 76. Because the operation is similar to that of FIG. 1, the circuit of FIG. 4 will not be explained in further detail. The overall response time of the circuit of FIG. 4 with the capacitor 78 has been found to be approximately 1 microsecond or less.

While it is to be expressly understood that the circuit specifications of the circuit breaker in accordance with this invention may vary according to the design for any particular application, the following specifications for the circuit of FIG. 4 are included by way of example only:

Battery 76 _____ 20 volts.
Tunnel diode 82 _____ HF 1001.
Transistor 84 _____ 2N 1231.
Resistor 88 _____ 250 ohms.
Resistor 90 _____ 3.3K ohms.
Resistor 94 _____ 22K ohms in series with a 50K ohm variable resistor.
Resistor 100 _____ 2.7K ohms.
Capacitor 78 _____ 100 picofarads.

When high speed circuit breaker action is desired and the supply voltage is unregulated so that considerable voltage fluctuation is present, the circuit of FIG. 5 may be desirable. The unregulated source may be represented by a battery 118 having a negative terminal coupled to ground and a positive terminal coupled to a lead 120. Load current is supplied from the lead 120, through the anode to cathode path of a tunnel diode 122, the emitter to collector path of a p-n-p type transistor 124 to a lead 126 and through a load 128 to ground. For developing a relatively constant emitter to base bias voltage with supply voltage variation, a diode 130 is coupled from the lead 120 to one end of a resistor 132 having the other end coupled to ground. The base of the transistor 124 is coupled through a resistor 134 having a value $R_1$ to a point between the diode 130 and the resistor 132. The diode 130 may be a conventional silicon diode having a relatively constant voltage drop as the voltage $V_1$ fluctuates. In response to temperature change, voltage variations of the diode 130 are at the same rate as voltage variations between the emitter and base of the transistor 122. Thus, the diode 130 provides compensation against temperature changes so that the circuit of FIG. 5 is highly temperature stable. A capacitor 138 is coupled across the tunnel diode 122 to prevent the circuit from being triggered in response to short term voltage or current transients, and a reset switch 140 is also coupled across the tunnel diode 122. It is to be noted that the remote trigger arrangement of FIG. 1 may also be utilized in the circuit of FIG. 5. For locking the circuit in the set condition such as the point 64 of FIG. 2 a resistor 142 having a value $R_2$ is coupled across the emitter and collector path of the transistor 124. Thus, when the transistor 124 is conducting, the relatively small voltage drop thereacross causes substantially no current $I_2$ to flow through the resistor 142. As the base current $I_B$ is relatively small and $I_2$ is substantially zero when the circuit is in the reset condition, the limit current $I_{LM}$ is equal to $I_P$ and substantially independent of voltage fluctuations of the source of potential such as the battery 118. Thus, the limit current $I_{LM}$ is a constant predetermined value in the circuit of FIG. 5. When the tunnel diode 122 triggers to the high voltage state and the circuit of FIG. 5 is in the set condition so that the transistor 124 is biased out of conduction, current $I_2$ flows through the resistor 142 and the load resistor 128 as the tunnel diode 122 is maintained at the point 64 of FIG. 2. The operation of the circuit of FIG. 5 is similar to that of FIG. 1 and will not be explained in further detail. Although the current $I_2$ flows through the load 128 when the circuit is in the set condition, this current may be selected to be relatively small.

Another modification of the circuit of the invention operating from an unregulated voltage supply shown in FIG. 6 may provide circuit breaking action with an adjustable limit current $I_{LM}$ at which the circuit triggers to the set condition. A source of voltage, which may be unregulated, is represented by a battery 148 having a negative terminal coupled to ground and a positive terminal coupled to a lead 150. Current is supplied to the load from the lead 150 through the anode to cathode path of a tunnel diode 156 to a lead 158, through the emitter to collector path of p-n-p type transistor 162 to a lead 164 and through a load resistor 166 to ground. Coupled in series across the battery 148 are diodes 172 and 174 and a resistor 176. The diodes may be conventional silicon diodes providing a relatively constant voltage drop as the voltage source represented by the battery 148 fluctuates in level. The base of the transistor 162 is coupled through a resistor 165 to an adjustable tap 166 contacting a resistor 180 which in turn is coupled from the lead 150 to a point between the diode 174 and the resistor 176. A capacitor 182 is coupled across the tunnel diode 156 to prevent the circuit from responding to short term transients, and a switch 184 is also coupled thereacross for resetting the circuit breaker. It is to be again noted that the remote control arrangement of FIG. 1 may be utilized across the tunnel diode 156 for triggering the circuit breaker of FIG. 6 to either the set or reset condition.

The stabilizing current $I_2$, when the transistor 162 is biased out of conduction, flows from the lead 158 through a resistor 186 coupled to the lead 164 and through the load 166. To provide an arrangement for varying the limit current $I_{LM}$ to a selected value below the peak current $I_P$, a resistor 188 is coupled from the lead 158 to an adjustable tap 190 contacting a resistor 192. To provide a constant voltage drop, the resistor 192 is coupled across a zener diode 194 which has an anode to cathode path coupled between the lead 150 and one end of a resistor 196, the other end being coupled to ground. The limit current $I_{LM}$ is independent of the $I_2$ current because substantially no $I_2$ current flows when the circuit is in the reset condition. The limit current may be expressed as:

$$I_{LM} = I_P - \frac{V_z'}{R_{188}}$$

where $V_z'$ is the fraction of constant voltage $V_z$ developed across the zener diode 194 and $R_{188}$ is the value of the resistor 188. Thus, adjusting the tap 190 changes the value of $V_z'$ and provides adjustment of the limit current $I_{LM}$. For example, when the arm 190 is in the position shown, the limit current may be very small as the current $$\frac{V_z'}{R_{188}}$$

is approximately equal to $I_P$. When the arm 190 is moved upward to the other end of the resistor 192, $V_z'$ is equal to zero and the limit current $I_{LM}$ is relatively large, being approximately equal to $I_P$. It is to be again noted that with all adjustments, sufficient current flows through the resistor 186 in the triggered or set condition to maintain a stable condition when the tunnel diode 156 is at the state shown by point 64 of FIG. 2. Also, it is to be noted that the arrangement of the resistor 186 across the transistor 162 provides operation with the limit current $I_{LM}$ substantially independent of fluctuations of the voltage source represented by the battery 148.

While it is to be expressly understood that the circuit specifications of the circuit breaker of FIG. 6 may vary according to the design for any particular application, the following specifications for the circuit of FIG. 6 are included by way of example only:

| | | |
|---|---|---|
| Battery 148 | volts | 100 |
| Diodes 172, 174 | | 1N456 |
| Diode 194 | | 1N720 |
| Tunnel diode 156 | | HF1004 |
| Transistor 162 | | 2N1234 |
| Resistor 176 | ohms | 18K |
| Resistor 180 | do | 500 |
| Resistor 165 | do | 2200 |
| Resistor 196 | do | 4K |
| Resistor 192 | do | 2K |
| Resistor 186 | do | 33K |
| Resistor 188 | do | 2K |
| Capacitor 182 | picofarads | 100 |

Although the circuits in accordance with this invention have been explained with p-n-p type transistors, the opposite type may be utilized within the principles of the invention. Also, it is to be understood that although tunnel diodes have been explained in the circuits, any appropriate negative resistance device may be utilized in accordance with this invention.

Thus, there has been described a circuit breaker that responds at a high speed accurately and reliably to a preselected limit load current. In one form of the invention, the circuit is relatively independent of fluctuations of the voltage source. In another form of the invention the circuit provides a simple adjustment of the limit current. The circuit in accordance with this invention also includes an arrangement for being tripped or reset from a remote source of signals.

What is claimed is:

1. A circuit comprising a source of potential, a tunnel diode having first and second ends with the first end coupled to said source of potential, a transistor having an emitter, a collector and a base with said emitter coupled to the second end of said tunnel diode, a load coupled between said collector and said source of potential, first impedance means coupled between said base and said source of potential, and second impedance means coupled between the second end of said tunnel diode and said source of potential.

2. A circuit comprising a source of potential having first, second and third terminals for respectively applying first, second and third potentials thereto, a load having first and second ends with said first end coupled to said first terminal, a tunnel diode having an anode end and a cathode end with said anode end coupled to said second terminal, a transistor having an emitter coupled to the cathode end of said tunnel diode, a collector coupled to the second end of said load, and having a base, a first resistor coupled between the base of said transistor and the third terminal of said source of potential, and a second resistor coupled between the cathode end of said tunnel diode and the first terminal of said source of potential.

3. A circuit breaker for disconnecting a source of voltage from a load at a predetermined load current comprising a tunnel diode having first and second ends with the first end coupled to the source of voltage, switching means having a load current path coupled between the second end of said tunnel diode and said load, said switching means having a control terminal coupled to said source of voltage, and a holding current path coupled between the second end of said tunnel diode and said source of voltage, whereby when said switching means is in a conductive state, said tunnel diode responds to the predetermined load current to bias said switching means to a nonconductive state so as to disconnect said source of voltage from said load, the holding current controlling said tunnel diode to maintain said switching means in the nonconductive state.

4. A circuit breaker for disconnecting a source of voltage from a load at a limit current comprising a negative resistance device having a low voltage state and a high voltage state and having first and second ends with said first end coupled to the source of voltage, switching means having a load current path coupled between the second end of said tunnel diode and said load, said switching means having a control terminal coupled to said source of voltage, and a holding current path coupled between the second end of said tunnel diode and said source of voltage, whereby said negative resistance device in the said low voltage state biases said switching means in a normal conductive state and responds to the limit current to change to said high voltage state so as to bias said switching means out of conduction and disconnect said source of voltage from said load with said holding current maintaining said negative resistance device in said high voltage state.

5. A circuit breaker for limiting the load current supplied from a source of voltage to a load to maximum value, the source of voltage applying first, second and third voltages to respective first, second and third terminals comprising a tunnel diode having an anode end and a cathode end with the anode end coupled to the first terminal of said source of voltage, a transistor having an emitter coupled to the cathode end of said tunnel diode and having a collector coupled to one end of said load, the other end of said load coupled to the third terminal of said source of voltage, said transistor having a base coupled to the second terminal of said source of voltage, impedance means coupled between the cathode end of said tunnel diode and the third terminal of said source of voltage, said tunnel diode responding to the maximum value of load current to bias said transistor out of conduction.

6. A circuit breaker for disconnecting a source of voltage from a load and for being reset by a trigger pulse comprising a tunnel diode having a low voltage state and a high voltage state with the high voltage state being maintained by a locking current, said tunnel diode having a first and second end with the first end coupled to the source of voltage, switching means having a load current path coupled between the second end of said tunnel diode and said load, said switching means having a control terminal coupled to said source of voltage, a locking current path coupled between the second end of said tunnel diode and said source of voltage, transformer means coupled between the first and second ends of said tunnel diode, and a source of trigger pulses coupled to said transformer means for biasing said tunnel diode to prevent said locking current from flowing therethrough during application of a trigger pulse, whereby said tunnel diode in said low voltage state biases said switching means in a conductive state and in response to a predetermined load current changes to said high voltage state to bias said switching means to a non conductive state so as to disconnect said source of voltage from said load, the locking current maintaining said tunnel diode at said high voltage state, said tunnel diode responding to a trigger pulse to again change to the low voltage state and bias said switching means back into the conductive state.

7. A circuit comprising a source of potential having first and second terminals, a tunnel diode having first and second ends with the first end coupled to the first terminal of said source of potential, a transistor having an emitter, a collector and a base with said emitter coupled to the second end of said tunnel diode, a load coupled between said collector and the second terminal of said source of potential, voltage divider means coupled between the first and second terminals of said source of potential, first impedance means coupled between said base and said voltage divider means, and second impedance means coupled between the second end of said tunnel diode and the second terminal of said source of potential.

8. A circuit comprising a source of potential having first and second terminals, a tunnel diode having a first and second end with the first end coupled to the first terminal of said source of potential, a transistor having an emitter, a collector and a base with said emitter coupled to the second end of said tunnel diode, a load coupled between said collector and the second terminal of said source of potential, diode means having a first and second end with the first end coupled to the first terminal of said source of potential, first impedance means coupled between the second end of said diode means and the second terminal of said source of potential, second impedance means coupled between said base and the second end of said diode means, and third impedance means coupled between the second end of said tunnel diode and said load.

9. A circuit for disconnecting an unregulated source of potential from a load at a predetermined limit current, the source of potential having a first and a second terminal comprising voltage divider means coupled between the first and second terminals, a tunnel diode having an anode and a cathode with the anode coupled to said first terminal, a transistor having an emitter, a collector and a base, said emitter coupled to the cathode of said tunnel diode and said collector coupled to one end of the load, the other end of said load coupled to said second terminal, a first resistor coupled between said base and said voltage divider means, and a second resistor coupled between said emitter and said collector, whereby said tunnel diode in a low voltage state biases said transistor to a conductive state, said tunnel diode in the low voltage state responding to a predetermined limit current to change to a high voltage state and bias said transistor to a non conductive state, current thus flowing through said second resistor to maintain said tunnel diode in the high voltage state.

10. A circuit for disconnecting an unregulated source of potential from a load at a predetermined limit current, the source of potential having a first and a second terminal comprising voltage divider means coupled between the first and second terminals, a tunnel diode having an anode and a cathode with the anode coupled to said first terminal, a transistor having an emitter, a collector and a base, said emitter coupled to the cathode of said tunnel diode and said collector coupled to one end of the load, the other end of said load coupled to said second terminal, a first resistor coupled between base and said voltage divider means, a second resistor coupled between said emitter and said collector, a capacitor coupled between the cathode and anode of said tunnel diode, and switching means coupled between the anode and cathode of said tunnel diode, whereby said tunnel diode in a low voltage state biases said transistor in a conductive state, said tunnel diode then responding to the predetermined limit current to trigger to a high voltage state and bias said transistor out of conduction, current thus flowing said second resistor to maintain said tunnel diode in the low voltage state, said switching means triggering said tunnel diode back to said low voltage state.

11. A circuit breaker operable with a relatively unregulated source of potential for disconnecting the source of potential from a load at a selected limit current comprising a tunnel diode having a first and second voltage state and having an anode end and a cathode end with the anode end coupled to said source of potential, a transistor having an emitter, a base and a collector with the emitter coupled to the cathode end of said tunnel diode and the collector coupled to one end of the load, the other end of the load coupled to said source of potential, voltage dividing means coupled across said source of potential, first impedance means coupled between said base and said voltage dividing means, diode means having a constant voltage drop with varying current and having first and second ends coupled across said source of potential, second impedance means coupled across said diode means, said second impedance means having an adjustable tap, third impedance means coupled between the cathode end of said tunnel diode and said adjustable tap, and fourth impedance means coupled between the emitter and collector of said transistor, whereby said tunnel diode normally in a first voltage state to maintain said transistor biased in conduction responds to the limit current to change to the second voltage state to bias said transistor out of conduction with current flowing through said fourth impedance means maintaining said tunnel diode in said second state, said adjustable tap providing selection of said limit current.

12. A circuit breaker for disconnecting a source of potential from a load at a selected limit current, the source of potential having a first and a second end, comprising a tunnel diode having an anode end and a cathode end with the anode end coupled to the first end of said source of potential, a transistor having an emitter, a collector, and a base with said emitter coupled to the cathode end of said tunnel diode and said collector coupled to one end of the load, the other end of said load coupled to the second end of said source of potential, diode means having a first and second end with the first end coupled to the first end of said source of potential, first impedance means coupled between the second end of said diode means and the second end of said source of potential, second impedance means coupled between the first end of said source of potential and the second end of said diode means and having an adjustable tap, third impedance means coupled between said base and the adjustable tap of said second impedance means, a zener diode having first and second ends with the first end coupled to the first end of said source of potential, fourth impedance means coupled between the second end of said zener diode and the second end of said source of potential, fifth impedance means coupled across said zener diode and having an adjustable tap, sixth impedance means coupled between the cathode end of said tunnel diode and the adjustable tap of said fifth impedance means, and seventh impedance means coupled between said emitter and said collector, said tunnel diode having a first voltage state for biasing said transistor to a conductive state, said tunnel diode then responding to a selected limit current to change to a second voltage state to bias said transistor to a non conductive state, the base current of said transistor being adjustable by the tap on said second impedance means so that said transistor is in a saturated condition when biased in a conductive state and said limit current being selected by varying the tap on said fifth impedance means.

References Cited in the file of this patent

Amodei et al.: "Exclusive-Or Logic Circuit Using a Tunnel Diode"; R.C.A. Technical Notes, No. 435; January 1961.